(12) United States Patent
Tagyo et al.

(10) Patent No.: US 12,069,697 B2
(45) Date of Patent: Aug. 20, 2024

(54) CONTROL APPARATUS, RESOURCE ALLOCATION METHOD AND PROGRAM

(71) Applicant: NIPPON TELEGRAPH AND TELEPHONE CORPORATION, Tokyo (JP)

(72) Inventors: Rie Tagyo, Musashino (JP); Tatsuaki Kimura, Musashino (JP); Keisuke Ishibashi, Musashino (JP); Daisuke Ikegami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 562 days.

(21) Appl. No.: 17/272,746

(22) PCT Filed: Sep. 17, 2019

(86) PCT No.: PCT/JP2019/036409
§ 371 (c)(1),
(2) Date: Mar. 2, 2021

(87) PCT Pub. No.: WO2020/059718
PCT Pub. Date: Mar. 26, 2020

(65) Prior Publication Data
US 2021/0212022 A1 Jul. 8, 2021

(30) Foreign Application Priority Data
Sep. 20, 2018 (JP) .................................. 2018-176503

(51) Int. Cl.
*H04W 72/30* (2023.01)
*H04W 52/36* (2009.01)
(Continued)

(52) U.S. Cl.
CPC ......... *H04W 72/30* (2023.01); *H04W 52/367* (2013.01); *H04W 72/0446* (2013.01); *H04W 72/52* (2023.01)

(58) Field of Classification Search
CPC ... H04W 24/02; H04W 28/16; H04W 52/367; H04W 72/0446; H04W 72/0473; H04W 72/30; H04W 72/52
See application file for complete search history.

(56) References Cited

U.S. PATENT DOCUMENTS

| 2004/0224668 | A1* | 11/2004 | Shell | H04L 41/0886 |
| | | | | 455/552.1 |
| 2007/0064732 | A1* | 3/2007 | Liaw | H04J 3/1694 |
| | | | | 370/468 |
| 2009/0088161 | A1* | 4/2009 | Narasimha | H04W 8/26 |
| | | | | 455/450 |

OTHER PUBLICATIONS

J. Jia, Y. Deng, J. Chen, A. H. Aghvami and A. Nallanathan, "Availability Analysis and Optimization in CoMP and CA-enabled HetNets," in IEEE Transactions on Communications, vol. 65, No. 6, pp. 2438-2450, Jun. 2017.
(Continued)

*Primary Examiner* — Khoa Huynh
(74) *Attorney, Agent, or Firm* — IPUSA, PLLC

(57) ABSTRACT

A control device of the present invention is for calculating allocation information regarding the allocation of wireless resources of a plurality of base stations to a plurality of user devices. The control device includes: information managing means for storing request data amounts of the user devices; calculating means for calculating an estimated waiting time for each of the user devices by dividing the request data amount by an available bandwidth, and, using the maximum transmission power of the base stations as a constraint, calculating the allocation information regarding the allocation of the wireless resources of the base stations to the user devices so as to minimize the estimated waiting time of the
(Continued)

user device having the highest estimated waiting time; and outputting means for outputting the allocation information that was calculated by the calculating means.

7 Claims, 6 Drawing Sheets

(51) Int. Cl.
 *H04W 72/0446* (2023.01)
 *H04W 72/52* (2023.01)

(56) References Cited

OTHER PUBLICATIONS

M. Haferkamp, B. Sliwa, C. Ide and C. Wietfeld, "Payload-Size and Deadline-Aware scheduling for time-critical Cyber Physical Systems," 2017 Wireless Days, Porto, 2017, pp. 4-7.

\* cited by examiner

Fig. 5

|  | 1st sub-frame | 2nd sub-frame |  |  |  |
|---|---|---|---|---|---|
| 1st sub-carrier | N_1 th UE | N_1 th UE | N_1 th UE | N_1 th UE | |
| 2nd sub-carrier | N_1 th UE | N_1 th UE | N_1 th UE | N_1 th UE | |
| ⋮ | N_2 th UE | N_2 th UE | N_2 th UE | N_2 th UE | |
| m<sup>th</sup> sub-carrier | N_3 th UE | N_3 th UE | N_3 th UE | N_3 th UE | |
| ⋮ | ⋮ | ⋮ | ⋮ | ⋮ | |
|  | ⋮ | ⋮ | ⋮ | ⋮ | |

CTI (Control Time Interval)

CONTROL APPARATUS, RESOURCE ALLOCATION METHOD AND PROGRAM

TECHNICAL FIELD

The present invention relates to a method for allocating resources in a network, and a system for the same, and in particular relates to technology for optimizing wireless resource allocation in view of user request data amounts and communication quality.

BACKGROUND ART

A wide range of applications and services have been in use in cellular networks of recent years, including some that require bandwidth for video streaming and the like, and others such as web browsing that have strict delay requirements, and there has also been an increase in the diversity of traffic properties and communication quality demanded by users who use such applications and services. A further increase in the diversity of traffic properties and demanded communication quality is expected due to the future prevalence of device communication in IoT, M2M, vehicle-to-vehicle communication, and the like. In light of this, it is critical for limited wireless resources to be able to be allocated efficiently while also meeting the communication quality demands of individual users.

Review is underway on the construction of HetNets (Heterogeneous Networks) in which cells of various sizes (small cells, micro cells, pico cells) are deployed in order to improve frequency efficiency in future networks. Furthermore, technology such as CA (Carrier Aggregation), in which bandwidth is expanded by using groups of CCs (Component Carriers) that have been divided into sub-carriers, and CoMP (Coordinated Multi-Point), in which interference between different cells is attenuated by cooperation between BSs (Base Stations).

Using such techniques makes it possible for wireless resources to be allocated more flexibly, but the number of items that need to be set for control is very large, and it is difficult to optimally allocate wireless resources in real-time while meeting the requested communication quality for all users. Also, in future networks where many cells will be deployed in a very dense manner (ultra dense networks), there is a big problem of a reduction in communication quality caused by inter-cell interference at base stations and users who are using the same frequency.

To address these problems, NPL 1 proposes a wireless resource allocation method in which, in a HetNet that uses COMP and CA, the availability of each UE (User Equipment) is analytically derived based on the position information of the UE and BSs, and the lowest value of the availability is maximized. Here, "availability" refers to the probability that the SINR (Signal to Interference plus Noise power Ratio) will exceed a desired value in one or more of all of the sub-carriers used by the UE. In the technique disclosed in NPL 1, allocating resources based on "availability" makes it possible to ensure connection reliability, but consideration is not given to the requested communication data amount or allocated communication capacity, and therefore the allocation is not optimal from the viewpoint of the communication quality required by individual users.

NPL 2 proposes a scheduling method that realizes deadline observance with consideration given to request data amounts by setting priorities according to how low the remaining data amount is and how short the deadline is in networks in which various applications such as M2M where users have different real-time needs are utilized. However, only the conditions in a single BS are envisioned, and consideration is not given to complex conditions such as inter-cell interference and a mixture of COMP, CA, and HetNet.

CITATION LIST

Non Patent Literature

[NPL 1] J. Jia, Y. Deng, J. Chen, A. H. Aghvami and A. Nallanathan, "Availability Analysis and Optimization in COMP and CA-enabled HetNets", in IEEE Transactions on Communications, vol. 65, no. 6, pp. 2438-2450, June 2017.

[NPL 2] M. Haferkamp, B. Sliwa, C. Ide and C. Wietfeld, "Payload-Size and Deadline-Aware scheduling for time-critical Cyber Physical Systems", 2017 Wireless Days, Porto, 2017, pp. 4-7.

SUMMARY OF THE INVENTION

Technical Problem

There is not currently a resource allocation method that aims to optimize user-felt communication quality while also giving consideration to the request data amounts of UEs and requested communication quality in future HetNets in which COMP and CA are active.

In light of the foregoing, an object of the present invention is to provide technology for resource allocation that realizes the optimization of user-felt communication quality based on UE request data amounts and the like.

Means for Solving the Problem

One aspect of the disclosed technology is a control device for calculating allocation information regarding allocation of wireless resources of a plurality of base stations to a plurality of user devices, the control device including: information managing means for storing request data amounts of the user devices; calculating means for calculating an estimated waiting time for each of the user devices by dividing the request data amount by an available bandwidth, and, using a maximum transmission power of the base stations as a constraint, calculating the allocation information regarding allocation of the wireless resources of the base stations to the user devices so as to minimize the estimated waiting time of a user device having a highest estimated waiting time; and outputting means for outputting the allocation information that was calculated by the calculating means.

Effects of the Invention

According to the disclosed technology, it is possible to provide technology for resource allocation that realizes the optimization of user-felt communication quality based on UE request data amounts and the like.

BRIEF DESCRIPTION OF DRAWINGS

FIG. 5 is a diagram showing the allocation of sub-carriers in the first embodiment.

DESCRIPTION OF EMBODIMENTS

Embodiments of the present invention are described below with reference to the drawings. The embodiments described below are merely examples, and applicable embodiments of the present invention are certainly not limited to the following embodiments. The following describes first to fifth embodiments. The first embodiment is a basic aspect of the present invention, and the second to fifth embodiments mainly describe differences from previously described embodiments. Note that the first to fifth embodiments can be implemented in any combination as long as no contradiction arises.

First Embodiment

<System Configuration>

Figure 1:
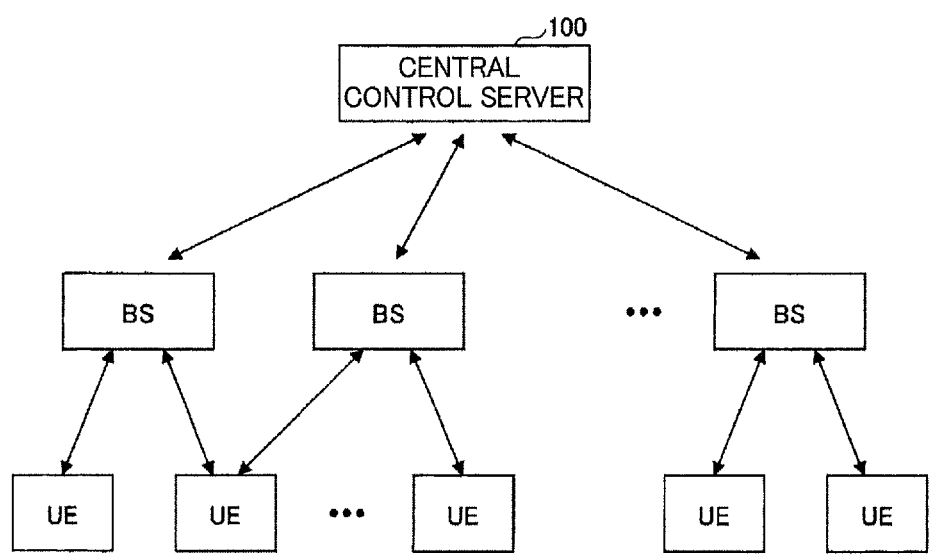
FIG. 1 is a diagram showing an overall configuration of a system in embodiments of the present invention.

FIG. 1 shows the overall configuration of a system in the first embodiment (similarly applies to the other embodiments as well). As shown in FIG. 1, the system of the first embodiment includes multiple BSs (Base Stations) and multiple UEs (User Equipment), and wireless communication is performed between the BSs and the UEs. The network used for communication between the BSs and the UEs is a cellular network such as an LTE or NR network here, but is not limited to being a network that uses a specific communication technique. Also, communication between the BSs and the UEs may be performed via a wireless LAN such as a Wi-Fi (registered trademark) LAN. In this case, the BS is an AP (Access Point).

As shown in FIG. 1, the system includes a central control server 100 that controls BSs that are located in a control zone. The central control server 100 may be a device that constructs a core network in a mobile communication network, or may be a device on a network other than a core network, or a certain BS or UE may play the role of the central control server 100. CA and CoMP are used in communication performed between BSs and UEs in the first embodiment.

Figure 2:
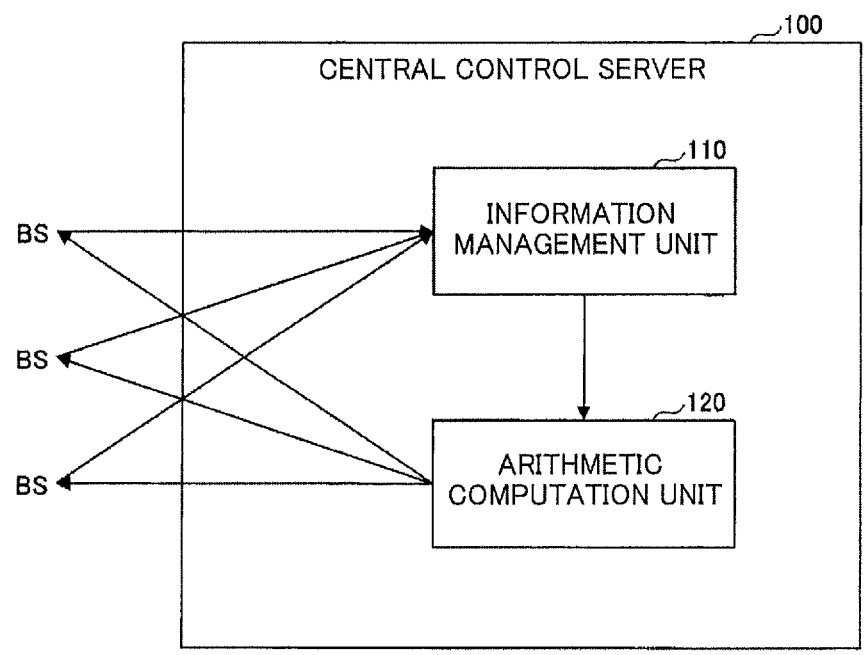
FIG. 2 is a diagram showing a function configuration of a central control server in a first embodiment.

FIG. 2 shows a function configuration of the central control server 100. As shown in FIG. 2, the central control server 100 includes an information management unit 110 and an arithmetic computation unit 120. The information management unit 110 holds information that is necessary when the arithmetic computation unit 120 performs calculation. The arithmetic computation unit 120 performs calculation for resource allocation as will be described later, and transmits the calculation results to the BSs. The BSs allocate resources to UEs based on the calculation results from the arithmetic computation unit 120.

The central control server 100 can be realized by the execution of a program that corresponds to processing implemented in the central control server 100, with use of hardware resources such as a CPU and a memory provided in a computer. The program can be recorded on a computer-readable recording medium (etc., a portable memory) for storage and distribution. Also, the program can be provided via a network such as the Internet or via e-mail.

Figure 3:
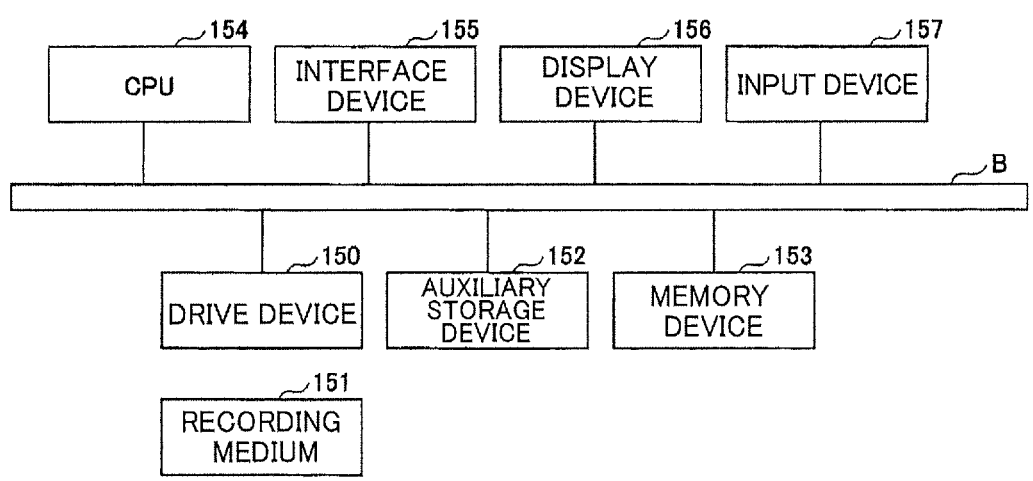
FIG. 3 is a diagram showing a hardware configuration of the central control server.

FIG. 3 is a diagram showing the hardware configuration of the aforementioned computer. The computer shown in FIG. 3 includes a drive device 150, an auxiliary storage device 152, a memory device 153, a CPU 154, an interface device 155, a display device 156, an input device 157, and the like that are connected to each other via a bus B.

The program that realizes processing performed in the computer is provided via a recording medium 151 such as a CD-ROM or a memory card. When the recording medium 151 having the program recorded thereon is set in the drive device 150, the program is installed from the recording medium 151 to the auxiliary storage device 152 via the drive device 150. Note that the program is not necessarily required to be installed via the recording medium 151, and may be downloaded from another computer via a network. The auxiliary storage device 152 is for storing the installed program and also storing necessary files, data, and the like.

When a program startup instruction has been given, the memory device 153 reads out the program from the auxiliary storage device 152 and stores the program. The CPU 154 realizes functionality of the central control server 100 in accordance with the program stored in the memory device 153. The interface device 155 is used as an interface for connecting to the network, and functions as an input means and an output means for input and output via the network. The display device 156 displays a GUI (Graphical User Interface) and the like in accordance with the program. The input device 157 is constituted by a keyboard, a mouse, and buttons, or by a touch panel, for example, and is used for the input of various operation instructions.

<Example of Operations of Central Control Server 100>

The following describes an example of operations of the central control server 100 in the first embodiment.

Here, $\text{Nset}=\{1, 2, \ldots, N\}$ is a set of UEs in the control zone of the system in which the above-described CA and COMP can be used, and $\text{Bset}=\{1, 2, \ldots, S\}$ is a set of BSs in the control zone. $\text{Qset}=\{1, 2, \ldots, Q\}$ is a set of frequency bands used by the BSs, and F is the number of sub-carriers into which each frequency band is divided. $\text{Mset}=\{1, \ldots, F, \ldots, (Q-1)F+1, \ldots, QF\}$ is a set of sub-carriers of the BSs.

Here, $v^m_{s,n}$ represents whether or not the s-th BS has allocated the m-th sub-carrier to the n-th UE. For $v^m_{s,n} \in \{0, 1\}$, 0 indicates no allocation, and 1 indicates allocation.

The following shows the set of BSs that have assigned the m-th sub-carrier to the n-th UE.

[Formula 1]

$$B_n^m = \{s | v_{s,n}^m = 1, s \in B\text{set}, m \in M\text{set}\} \quad \text{Formula 1}$$

Coordination in the set of BSs is realized through COMP-JP (Joint Processing), for example. COMP-JP is one type of COMP realization, and allows BSs to coordinate in order to utilize inter-cell interference as a transmission signal.

The following describes the reception power and SINR of UEs in order to define the available bandwidth of UEs. Although any radio wave propagation model may be used, consider using the statistic channel model described below.

At a distance d between a BS and a UE, the reception power of the UE is expressed as $P \times H \times l(d)$, where P is the transmission power of the BS and H is a stochastic variable indicating channel phasing. Here, $l(d)$ is a path loss function, and although various models have been proposed, hereinafter, the following expresses $l(d)$ for the frequency band q to which the sub-carrier m belongs.

[Formula 2]

$$l(d) = C_q d^{-\alpha_q} \quad \text{Formula (2)}$$

Note that in the above formula, $C_q$ is a constant attributed to the frequency band q, and $\alpha_q$ is a path loss multiplier in the q frequency band.

Here, according to Formula 1, the SINR in the m-th sub-carrier of the n-th UE is given by Formula 3 below.
[Formula 3]

$$SINR_n^m = \frac{\sum_{i \in B_n^m} P_{i,m} H_{i,n} C_q d_{i,n}^{-\alpha_q}}{\sum_{j \in Bset - B_n^m} P_{j,m} H_{j,n} C_q d_{j,n}^{-\alpha_q} + N_0} \quad \text{Formula (3)}$$

Here, in Formula 3, letting $P_{s,m} \in (0, P_s^{max}]$ be the power allocated to the m-th sub-carrier of the s-th BS, $P_s^{max}$ represents the maximum power of the s-th BS. Also, $d_{i,n}$ is the distance between the i-th BS and the n-th UE, and $N_0$ is noise caused by an external factor such as thermal noise. Here, $H_{i,n}$ is a stochastic variable that represents phasing between the i-th BS and the n-th UE, but it is also possible to use a value predicted based on past channel states. Note that q is given by the smallest integer that does not fall below m/F.

Based on the SINR, the available bandwidth of the n-th UE is given by Formula 4 below.
[Formula 4]

$$T_n = E\left[\sum_{m \in Mset} \log(1 + SINR_n^m)\right] \quad \text{Formula (4)}$$

Here, in Formula 4, the sum by m represents the extension of the band using CA. In Formula 4, SINR represents a stochastic variable, and E[•] means that an expected value is taken at SINR.

In the system of the present embodiment, the time width for performing control is called the CTI (Control Time Interval), and the CTI can be set as any time width.

When performing control in a certain CTI, each UE in the zone controlled by the central control server 100 (in the control zone) reports its position $x_n$ and its downlink request data amount $D_n$ to the central control server 100 through the $B_n^m$ that was assigned in the previous CTI. The reported information is acquired and stored by the information management unit 110 of the central control server 100. Note that if a $B_n^m$ was not assigned in a previous CTI, the information is reported through the primary BS that has the highest reception power. Note that the BS used for reporting is certainly not limited to this, and any BS may be used as long as the information can be reported.

Note that this information may be predicted values that are estimated based on past UE positions $x_n$ and UE downlink request data amounts $D_n$ or the like, or based on another information source.

Figure 4:
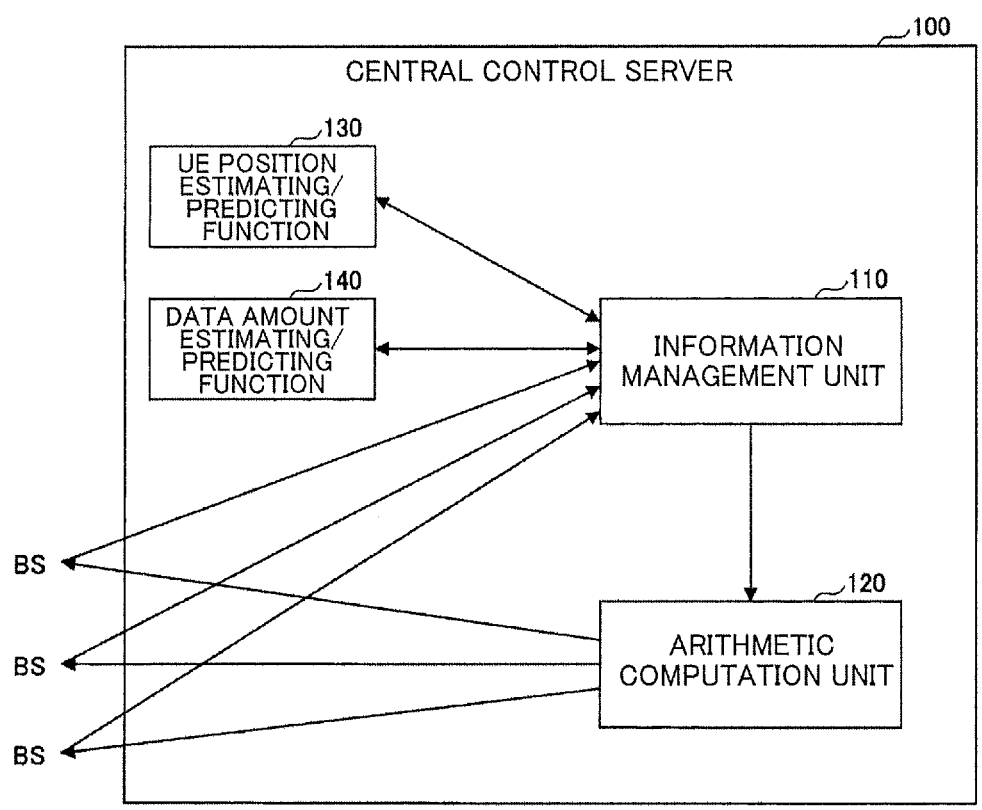
FIG. 4 is a diagram showing a function configuration of the central control server in the first embodiment.

FIG. 4 shows an example of the configuration of the central control server 100 in the case of estimating a UE position and request data amount and using predicted values. As shown in FIG. 4, the central control server 100 includes a UE position estimating/predicting function 130 and a data amount estimating/predicting function 140. Note that in the case of estimating the UE position and the request data amount and using predicted values, the UE position estimating/predicting function 130 and the data amount estimating/predicting function 140 may be provided outside of the central control server 100.

The arithmetic computation unit 120 of the central control server 100 calculates v and P that solve the optimization problem represented by Formula 7 below after satisfying $\Sigma_m P_{s,m} \leq P_s^{max}$ for all BSs under the condition that the position $y_s$ of each BS is known. Here, v and P are expressed as shown below.
[Formula 5]

$$v = \{v_{s,n}^m | s \in Bset, n \in Nset, m \in Mset\} \quad \text{Formula (5)}$$

[Formula 6]

$$P = \{P_{s,m} | s \in Bset, m \in Mset\} \quad \text{Formula (6)}$$

[Formula 7]

$$\min_{v,P} \max_n \frac{D_n}{T_n} \quad \text{Formula (7)}$$

Here, letting the maximum transmission powers of the BSs be a constraint ($\Sigma_m P_{s,m} \geq P_s^{max}$), the arithmetic computation unit 120 calculates the estimated waiting time ($D_n/T_n$) by dividing the request data amount by the available bandwidth, and calculates the resource allocation (v, P) that minimizes the estimated wait time ($\max_n(D_n/T_n)$) of the UE whose estimated wait time is the highest among all of the UEs. As shown in Formula 5, v is a set of allocations of the m-th sub-carrier of the s-th BS to the n-th UE. Also, as shown in Formula 6, P is a set of transmission powers allocated to the m-th sub-carrier of the s-th BS. Note that the estimated waiting time corresponds to the communication quality felt by the user.

The calculated resource allocation information (v, P) indicating the allocation of wireless resources of the BSs to the UEs is output from the arithmetic computation unit 120 and notified to the BSs. The BSs allocate their sub-carriers to the UEs with corresponding powers based on the resource allocation information.

The arithmetic computation unit 120 calculates v and P every CTI. The allocation of sub-carriers of BSs to UEs is performed based on the calculation results. More specifically, for each CTI, the arithmetic computation unit 120 reads out UE positions, BS positions, $D_n$, parameters necessary for SINR calculation, and the like from the information management unit 110, performs the calculation of Formula 7, and notifies the BSs of the calculation results. The BSs then allocate resources to the UEs based on the calculation results.

FIG. 5 is a diagram showing an example of resource allocation in a CTI for a BS. In the example show in FIG. 5, the resource "1st to 4th sub-frame×1st to 2nd sub-carrier" has been allocated to the N 1th UE. Note that "sub-carrier" is the unit of allocation in terms of frequency, and "sub-frame" is the unit of allocation in terms of time.

Second Embodiment

The following describes a second embodiment of the present invention.

In the first embodiment, resource allocation is performed in accordance with the request data amounts $D_n$ of the UEs, but if there is a bias in the request data amounts of the UEs, it is possible that fairness cannot be ensured due to a situation in which many resources are allocated to only UEs whose request data amounts are much larger than other UEs. In view of this, in the second embodiment, an upper limit is set for the request data amount. This will be described in more detail below.

Similarly to the first embodiment, the information management unit 110 of the central control server 100 acquires the UE positions $x_n$ and the downlink request data amounts $D_n$ of the UEs in the zone that is controlled (in the control zone), and at the same time, the arithmetic computation unit 120 calculates a threshold value $\sim D_n$ for the request data amounts $D_n$ of the UEs. This information is held in the information management unit 110. Note that in the text of this specification, the wavy line over a letter is placed before the letter as in "$\sim D_n$" for the sake of convenience.

Although there are no limitations on the method used to set the threshold value $\sim D_n$, as one example, the maximum data transfer amount that can be realized when the n-th UE uses all resources is set as the threshold value $\sim D_n$.

Specifically, the maximum SINR that can be realized for the n-th UE when there are no other UEs is given by Formula 8 below.

[Formula 8]

$$SINR_n^{m,max} = \frac{\sum_{i \in Bset} P_{i,m} H_{i,n} C_q d_{i,n}^{-\alpha_q}}{N_0} \quad \text{Formula (8)}$$

Based on the maximum SINR, the maximum available bandwidth for the n-th UE is given by Formula 9 below.

[Formula 9]

$$T_n^{max} = E\left[\sum_{m \in Mset} \log(1 + SINR_n^{m,max})\right] \quad \text{Formula (9)}$$

Based on the maximum available bandwidth T max for the n-th UE, the threshold value $\sim D_n$ is calculated by $\sim D_n = T_n^{max} \times \tau$, where $\tau$ is the CTI time width.

The above is one example of a method for setting the threshold value $\sim D_n$. In the case where the data transfer amount to be achieved on the system side is to be designated for each application, the operator may set a desired value as the threshold value $\sim D_n$ based on other obtained information such as an application ID number, and store that threshold value in the information management unit 110. A configuration is also possible in which the same threshold value $\sim D_n$ is set for all users and stored in the information management unit 110.

In the second embodiment, the arithmetic computation unit 120 of the central control server 100 calculates v and P that solve the optimization problem represented by Formula 10 below after satisfying $\Sigma_m P_{s,m} \leq P_s^{max}$ for all BSs under the condition that the position $y_s$ of each BS is known.

[Formula 10]

$$\min_{v,P} \max_n \frac{\min(D_n, \hat{D}_n)}{T_n} \quad \text{Formula (10)}$$

Here, using whichever of the request data amount ($D_n$) of the UEs and the threshold value ($\sim D_n$) is smaller, the arithmetic computation unit 120 calculates the resource allocation (v, P) that minimizes the estimated waiting time ($\max_n(\min(D_n,)/T_n)$) of the UE that has the highest estimated waiting time among all of the UEs.

The calculated resource allocation information (v, P) indicating the allocation of wireless resources of the BSs to the UEs is output from the arithmetic computation unit 120 and notified to the BSs. The BSs then allocate their sub-carriers to the UEs.

The arithmetic computation unit 120 calculates v and P every CTI. The allocation of sub-carriers of BSs to UEs is performed based on the calculation results.

Setting the threshold value as described above makes it possible to avoid a situation where many resources are allocated to only UEs that have much higher request data amounts than other UEs, thus making it possible to ensure fairness when resources are allocated to UEs.

Third Embodiment

The following describes a third embodiment of the present invention.

In the third embodiment, a constraint for preventing a reduction in the overall communication performance of the UEs is added when solving the optimization problem in Formula 7 of the first embodiment or when solving the optimization problem in Formula 10 of the second embodiment.

For example, the arithmetic computation unit 120 obtains a solution that solves the optimization problem of Formula 7 or 10 after satisfying the constraint that the available bandwidth of all UEs is greater than or equal to a threshold value $T_{th}$ ($T_n \geq T_{th}$), for example.

Adding this constraint makes it possible to ensure a minimum communication speed for even UEs that have a very low request data amount, thus making it possible to ensure fairness from the viewpoint of the overall communication performance of the UEs.

Fourth Embodiment

The following describes a fourth embodiment of the present invention.

In the first to third embodiments described above, it is assumed that the allocation of sub-carriers does not change in the CTI period set for UEs. For example, as shown in FIG. 5 described in the first embodiment, the sub-carriers allocated to the N 1th UE are the 1st and 2nd sub-carriers, and this does not change in the CTI period.

However, in the fourth embodiment, BSs allocate sub-carriers flexibly in the time direction in a CTI in any of the methods described in the first to third embodiments.

In general, in wireless resource allocation, the allocation of a frequency band to one UE in a certain time period serves as the smallest unit, and that smallest unit is called a RB (Resource Block), whereas the unit in terms of frequency is called a sub-carrier, and the unit in terms of time is called a sub-frame.

In the present invention, the CTI may be any length, but in general, the calculation time for finding a combination of resource allocation that satisfies Formula 7 of the first embodiment or Formula 10 of the second embodiment is longer than one sub-frame. In view of this, in the fourth embodiment, sub-carrier allocation is performed in units of sub-frames which is a smaller unit than the CTI.

In the fourth embodiment, the arithmetic computation unit 120 calculates sub-carrier allocation probabilities for each CTI. Note that the CTI is a longer time width than a sub-frame. Here, $v^m_{s,n}$ represents the probability of the m-th sub-carrier of the s-th BS being allocated to the n-th UE, and assume here that $v^m_{s,n} \in [0,1]$.

In the fourth embodiment, in a CTI period, each BS performs random scheduling weighted by the calculated sub-carrier allocation probability $v^m_{s,n}$ in units of sub-frames. This means that for the m-th sub-carrier of the s-th BS, letting $N_{RB}$ be the number of RBs included in the CTI period, the expected value of the number of RBs allocated to the n-th UE is $N_{RB} \times v_{s,n}^m$.

Figure 6:
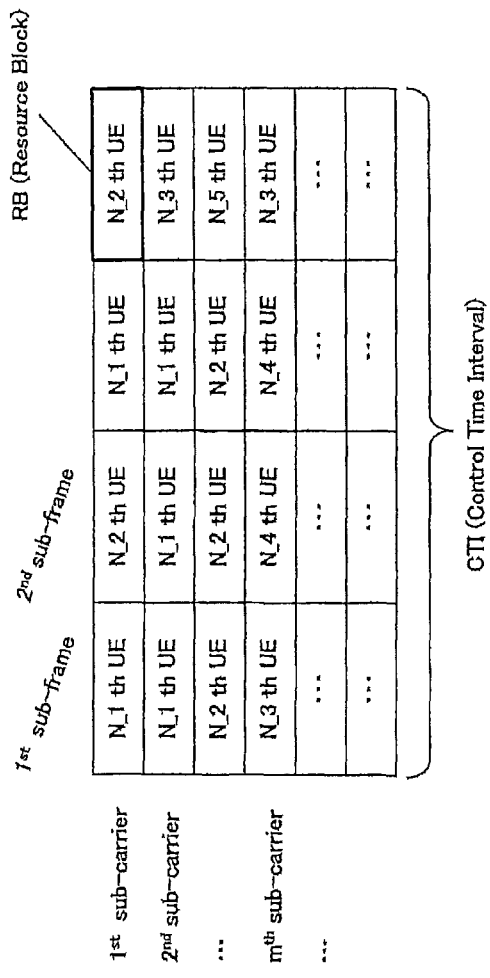
FIG. 6 is a diagram showing the allocation of sub-carriers in a fourth embodiment.

FIG. 6 shows an example of sub-carrier allocation in a CTI in the fourth embodiment. For example, the 1st sub-carrier and the 2nd sub-carrier are allocated to the N 1th UE in the 1st sub-frame and the 3rd sub-frame, the 2nd sub-carrier is allocated in the 2nd sub-frame, and no sub-carriers are allocated in the 4th sub-frame.

In the fourth embodiment, Formula 1 of the first embodiment is replaced with Formula 11 shown below.
[Formula 11]

$$B_n^m = \{s | v_{s,n}^m \neq 0, s \in B\text{set}, m \in M\text{set}\} \quad \text{Formula (11)}$$

In other words, in the fourth embodiment, the set of BSs that have assigned the m-th sub-carrier to the n-th UE is a set of BSs for which the probability $v_{s,n}^m$ is not 0.

For each CTI, the arithmetic computation unit 120 performs calculation to solve the optimization problem of Formula 7 (if the first embodiment) or Formula 10 (if the second embodiment), and calculates v and P. Here, v is the set of probabilities $v_{s,n}^m$ that the moth sub-carrier of the s-th BS is allocated to the n-th UE. The calculated v and P are transmitted to the BSs, and the BSs perform random scheduling in the CTI.

Fifth Embodiment

The following describes a fifth embodiment.

In the fifth embodiment, a priority $w_n$ is added to the information that is input to the arithmetic computation unit 120 of the second embodiment (the information that is read out from the information management unit 110), and therefore not only is consideration given to the request data amount, but also a priority corresponding to the type of application used by the UE for example is also provided in order to be able to handle a greater diversity of communication quality requests.

Specifically, priority control is performed by introducing the priority $w_n$ to the n-th UE. The value of $w_n$ may be set for each UE in advance by the operator and stored in the information management unit 110, or may be set for each application based on an analysis performed by the central control server 100 regarding the application used by the UE or the communication destination and stored in the information management unit 110.

The priority $w_n$ is stored in the information management unit 110. The arithmetic computation unit 120 of the central control server 100 reads out, from the information management unit 110, information necessary for calculation, such as the priorities $w_n$ and the BS positions $y_s$, and calculates v and P so as to solve the optimization problem shown in Formula 12 below after satisfying $\Sigma_m P_{s,m} \leq P_s^{max}$ for all of the BSs.
[Formula 12]

$$\underset{v,P}{\operatorname{minmax}}\frac{\min(D_n, \tilde{D}_n) * w_n}{T_n} \quad \text{Formula (12)}$$

The operations performed thereafter are similar to those of the embodiments described above.

Here, if $w_n$ is set as shown below, wireless resource control can be realized based on only priority, without consideration given to request data amount.
[Formula 13]

$$w_n = w_n / \min(D_n, \tilde{D}_n) \quad \text{Formula (13)}$$

Effects of Embodiments and the Like

As described above, in the embodiments of the present invention, wireless resources of BSs are allocated to UEs based on the positions of the Bs and the UEs in the control zone, with consideration given to the SINRs of the UEs and the request data amounts and/or a priority that is based on the requested communication quality. This wireless resource allocation is the allocation of wireless resources so as to optimize the communication quality felt by the user.

Accordingly, it is possible to allocate limited wireless resources while satisfying user needs in a situation where UEs can become connected to multiple BSs. It is also possible to provide a network that improves the communication quality for individual users.

Summary of Embodiments

An embodiment of the present invention provides a control device that is for calculating allocation information regarding allocation of wireless resources of a plurality of base stations to a plurality of user devices, and includes information managing means, calculating means, and outputting means. Here, the information managing means stores request data amounts of the user devices. The calculating means calculates the allocation information regarding allocation of the wireless resources of the base stations to the user devices so as to minimize the estimated waiting time of the user device having the highest estimated waiting time, using the maximum transmission power of the base stations as a constraint. Here, the estimated waiting time is obtained by dividing the request data amount by the available bandwidth. The outputting means outputs the allocation information that was calculated by the calculating means.

The information management unit 110 described above is one example of the information managing means. Also, the arithmetic computation unit 120 is one example of the calculating means and the outputting means.

Another embodiment of the present invention provides a control device that is for calculating a probability regarding allocation of wireless resources of a plurality of base stations to a plurality of user devices in a predetermined time period, and includes information managing means, calculating means, and outputting means. Here, the information managing means stores request data amounts of the user devices. The calculating means calculates the probability of allocation in the predetermined time period for allocation information regarding allocation of the wireless resources of the base stations to the user devices so as to minimize the estimated waiting time of the user device having the highest estimated waiting time, using the maximum transmission power of the base stations as a constraint. Here, the estimated waiting time is obtained by dividing the request data amount by the available bandwidth. The outputting means outputs the allocation information that was calculated by the calculating means.

The information managing means may further store an upper limit threshold value of the request data amounts of the user devices, and the calculating means may calculate the estimated waiting time of each of the user devices using whichever of the request data amount of the user device and the threshold value is smaller, and calculate the allocation information based on the calculated estimated waiting times.

The calculating means may add a constraint regarding the available bandwidth so as to prevent a reduction in overall communication performance of the user devices when calculating the allocation information.

The information managing means may further store a priority regarding the user devices, and the calculating means may weight the estimated waiting times with the priorities when calculating the allocation information.

Although embodiments have been described above, the present invention is not limited to these specific embodiments, and various modifications and variations are possible within the scope of the present invention recited in the patent claims.

REFERENCE SIGNS LIST

100 Central control server
110 Information management unit
120 Arithmetic computation unit
130 UE position estimating/predicting function
140 Data amount estimating/predicting function
150 Drive device
151 Recording medium
152 Auxiliary storage device
153 Memory device
154 CPU
155 Interface device
156 Display device
157 Input device

The invention claimed is:

1. A control device for calculating allocation information regarding allocation of wireless resources of a plurality of base stations to a plurality of user devices, the control device comprising:
an information managing device for storing requested data amounts of each of the plurality of user devices; and
a processor electrically coupled to the information managing device, the processor being configured to:
calculate an estimated waiting time for each of the plurality of user devices by dividing the requested data amount of each of the plurality of user devices by an available bandwidth;
use a maximum transmission power of the base stations;
calculate the allocation information regarding allocation of the wireless resources of the base stations to the plurality of user devices so as to minimize the estimated waiting time of a user device having a highest estimated waiting time; and
output the calculated allocation information.

2. The control device according to claim 1, wherein the information managing device is further configured to store an upper limit threshold value of the requested data amounts of each of the plurality of user devices, and
the processor is configured to calculate the estimated waiting time of each user device of the plurality of user devices using the smaller of either of the requested data amount of each of the plurality of user devices or the upper limit threshold value of the requested data amounts of each of the plurality of user devices, and to calculate the allocation information based on the calculated estimated waiting times.

3. The control device according to claim 1, wherein the processor is configured to add a constraint regarding the available bandwidth to the calculated allocation information so as to prevent a reduction in overall communication performance of the user devices.

4. The control device according to claim 1, wherein the information managing device is further configured to store a priority for each of the plurality of user devices, and
the processor is configured to assign a weighting to the calculated estimated waiting times of each of the plurality of user devices with the priorities for each of the plurality of user devices.

5. A control device for calculating a probability regarding allocation of wireless resources of a plurality of base stations to a plurality of user devices in a predetermined time period, the control device comprising:
an information managing device for storing requested data amounts of each of the plurality of user devices; and
a processor electrically coupled to the information managing device, the processor being configured to:
calculate an estimated waiting time for each of the plurality of user devices by dividing the requested data amount of each of the plurality of user devices by an available bandwidth;
use a maximum transmission power of the base stations;
calculate the probability of allocation of the wireless resources within the predetermined time period for allocation information regarding allocation of the wireless resources of the base stations to the plurality of user devices so as to minimize the estimated waiting time of a user device having a highest estimated waiting time; and
output calculated allocation information.

6. A resource allocation method executed by a control device, the control device being for calculating allocation information regarding allocation of wireless resources of a plurality of base stations to a plurality of user devices and including an information managing device for storing requested data amounts of each of the plurality of user devices, the method comprising:
calculating an estimated waiting time for each of the plurality of user devices by dividing the requested data amount of each of the plurality of user devices by an available bandwidth;
using a maximum transmission power of the base stations;
calculating the allocation information regarding allocation of the wireless resources of the base stations to the plurality of user devices so as to minimize the estimated waiting time of a user device having a highest estimated waiting time; and
outputting the calculated allocation information.

7. A non-transitory computer readable medium storing a program that causes a computer to execute the method according to claim 6.

* * * * *